(12) United States Patent
Jeong et al.

(10) Patent No.: US 10,944,539 B2
(45) Date of Patent: Mar. 9, 2021

(54) METHOD AND APPARATUS FOR BACKSCATTER COMMUNICATION OF PATTERN-BASED DEMODULATION

(71) Applicants: Electronics and Telecommunications Research Institute, Daejeon (KR); Kwangwoon University Industry-Academic Collaboration Foundation, Seoul (KR); FOUNDATION FOR RESEARCH AND BUSINESS, SEOUL NATIONAL UNIVERSITY OF SCIENCE AND TECHNOLOGY, Seoul (KR)

(72) Inventors: Byung Jang Jeong, Seoul (KR); Jae-Han Lim, Seoul (KR); Hwanwoong Hwang, Seoul (KR); Ji-Hoon Yun, Seoul (KR)

(73) Assignees: Electronics and Telecommunications Research Institute, Daejeon (KR); Kwangwoon University Industry-Academic Collaboration Foundation, Seoul (KR); FOUNDATION FOR RESEARCH AND BUSINESS, SEOUL NATIONAL UNIVERSITY OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 16/542,468

(22) Filed: Aug. 16, 2019

(65) Prior Publication Data
US 2020/0220707 A1    Jul. 9, 2020

(30) Foreign Application Priority Data

Jan. 9, 2019    (KR) .................. 10-2019-0002794

(51) Int. Cl.
*H04L 7/00* (2006.01)
*H04L 7/033* (2006.01)

(52) U.S. Cl.
CPC ............ *H04L 7/0087* (2013.01); *H04L 7/033* (2013.01)

(58) Field of Classification Search
CPC ... H04L 7/0087; H04L 7/033; B60C 23/0449; H04M 2250/04; H04N 2201/006
See application file for complete search history.

(56) References Cited

U.S. PATENT DOCUMENTS 3,824,466 A * 7/1974 Olier ................. H04L 27/144
                                                     375/272
4,613,974 A * 9/1986 Vokac ................ H04L 27/00
                                                     329/311
(Continued)

FOREIGN PATENT DOCUMENTS

| KR | 101590291 B1 | 2/2016 |
| KR | 101668559 B1 | 10/2016 |
| KR | 101733340 B1 | 5/2017 |

OTHER PUBLICATIONS

Bryce Kellogg, et al., "Wi-Fi Backscatter: Internet Connectivity for RF-Powered Devices", 2014, SIGCOMM.

(Continued)

*Primary Examiner* — James M Perez
(74) *Attorney, Agent, or Firm* — William Park & Associates Ltd.

(57) ABSTRACT

A backscatter communication method and apparatus based on pattern-based demodulation is disclosed. The backscatter communication method includes receiving a communication signal, and demodulating the communication signal based on a slope of the communication signal at an edge of each time interval.

16 Claims, 10 Drawing Sheets

(56) References Cited

U.S. PATENT DOCUMENTS

| | | | | |
|---|---|---|---|---|
| 5,440,269 A * | 8/1995 | Hwang | .................. | H03D 3/006 329/318 |
| 5,590,157 A * | 12/1996 | Schuur | .................... | H04L 7/033 329/325 |
| 5,828,270 A * | 10/1998 | Chang | .................. | H03K 7/00 332/106 |
| 6,064,695 A * | 5/2000 | Raphaeli | .............. | H04B 1/7093 375/230 |
| 6,087,981 A * | 7/2000 | Normant | .............. | G01S 13/282 342/131 |
| 6,130,602 A * | 10/2000 | O'Toole | ................ | H03L 7/0995 340/10.33 |
| 6,193,659 B1 * | 2/2001 | Ramamurthy | ......... | A61B 8/481 600/443 |
| 6,335,946 B1 * | 1/2002 | Winnberg | ................ | H04B 1/69 375/132 |
| 6,418,158 B1 * | 7/2002 | Vishwanath | ......... | H04B 7/2125 370/350 |
| 6,493,398 B1 * | 12/2002 | Erisman | .................. | H04L 27/02 375/295 |
| 6,549,562 B1 * | 4/2003 | Olaker | .................... | H04B 1/69 375/139 |
| 6,665,356 B1 * | 12/2003 | Goeddel | .............. | H04L 7/0334 375/329 |
| 7,633,377 B2 * | 12/2009 | Sadr | ...................... | G06K 7/0008 340/10.1 |
| 8,175,134 B1 * | 5/2012 | Giallorenzi | ............ | H04B 1/713 375/140 |
| 8,406,275 B2 * | 3/2013 | Sforza | .................... | H04L 27/12 375/139 |
| 8,644,119 B2 * | 2/2014 | Schep | .................... | G11B 27/24 369/44.13 |
| 8,718,117 B2 * | 5/2014 | Hiscock | ................ | H04B 1/713 375/139 |
| 8,897,735 B2 * | 11/2014 | Kim | ...................... | H04B 1/525 455/295 |
| 8,929,494 B2 * | 1/2015 | Lee | .................... | G06K 7/10356 375/349 |
| 9,054,904 B2 * | 6/2015 | Jung | ...................... | H04L 1/06 |
| 9,319,098 B2 * | 4/2016 | Hiscock | ................ | H04B 1/713 |
| 9,379,785 B2 * | 6/2016 | Shameli | .................. | H04B 5/02 |
| 9,413,418 B2 * | 8/2016 | Bottazzi | ................ | G01S 13/75 |
| 10,164,482 B2 * | 12/2018 | Park | ........................ | H04L 1/00 |
| 10,327,740 B2 * | 6/2019 | Insana | .................. | A61B 8/5246 |
| 2002/0009125 A1 * | 1/2002 | Shi | ............................ | H04B 1/69 375/139 |
| 2002/0149416 A1 * | 10/2002 | Bandy | ................ | G06K 7/10069 327/536 |
| 2003/0142764 A1 * | 7/2003 | Keevill | .............. | H04L 27/2662 375/341 |
| 2003/0151497 A1 * | 8/2003 | Cole | .................. | G06K 7/10039 340/10.34 |
| 2003/0198302 A1 * | 10/2003 | Song | ...................... | H04L 25/062 375/340 |
| 2004/0178944 A1 * | 9/2004 | Richardson | ........... | G01S 13/904 342/43 |
| 2005/0163202 A1 * | 7/2005 | Hampel | .................. | H04L 7/043 375/219 |
| 2005/0251369 A1 * | 11/2005 | DeCarlo | .............. | G01L 23/085 702/190 |
| 2006/0107307 A1 * | 5/2006 | Knox | .................. | H04L 63/0492 726/2 |
| 2007/0071036 A1 * | 3/2007 | Okunev | .................. | H04L 7/042 370/503 |
| 2008/0137717 A1 * | 6/2008 | Lee | .......................... | H04J 11/00 375/139 |
| 2009/0086869 A1 * | 4/2009 | Bae | ...................... | G06K 7/10297 375/360 |
| 2009/0240455 A1 * | 9/2009 | Fromme | ................ | G01K 11/32 702/85 |
| 2010/0054348 A1 * | 3/2010 | Choi | ........................ | H04B 3/54 375/259 |
| 2010/0150209 A1 * | 6/2010 | Gonzalez | ................ | G01S 11/02 375/139 |
| 2011/0015800 A1 * | 1/2011 | Crist | ...................... | A01G 25/16 700/296 |
| 2012/0114026 A1 * | 5/2012 | Nguyen | .................. | G01S 7/006 375/220 |
| 2012/0127021 A1 * | 5/2012 | Gravelle | .............. | G01S 13/765 342/130 |
| 2012/0207259 A1 * | 8/2012 | Crain | .................... | H03L 7/0807 375/371 |
| 2012/0269232 A1 * | 10/2012 | Hiscock | ................ | H04B 1/713 375/139 |
| 2013/0162401 A1 * | 6/2013 | Bae | ...................... | H04L 25/0384 340/10.1 |
| 2014/0273898 A1 * | 9/2014 | Brown | .................... | H04B 1/26 455/142 |
| 2016/0116936 A1 * | 4/2016 | Jeong | .................. | G06F 13/4068 713/503 |
| 2016/0233728 A1 * | 8/2016 | Park | ........................ | H02J 7/025 |
| 2016/0329931 A1 * | 11/2016 | Mukherjee | ........... | H04B 5/0012 |
| 2017/0052041 A1 * | 2/2017 | Cedilnik | .................. | G01L 1/242 |
| 2017/0160381 A1 * | 6/2017 | Cho | .......................... | G01S 7/40 |
| 2019/0253135 A1 * | 8/2019 | Jeong | .................. | H04B 1/006 |
| 2020/0003894 A1 * | 1/2020 | Giancristofaro | ........ | G01S 7/003 |
| 2020/0052734 A1 * | 2/2020 | Talla | .................... | H04B 1/7143 |
| 2020/0220707 A1 * | 7/2020 | Jeong | ........................ | H04B 5/00 |

OTHER PUBLICATIONS

Vincent Liu, et al., "Ambient Backscatter: Wireless Communication Out of Thin Air", 2013, pp. 39-50, SIGCOMM.

* cited by examiner

300

350

METHOD AND APPARATUS FOR BACKSCATTER COMMUNICATION OF PATTERN-BASED DEMODULATION

CROSS-REFERENCE TO RELATED APPLICATIONS

This application claims the benefit under 35 USC § 119(a) of Korean Patent Application No. 10-2019-0002794 filed on Jan. 9, 2019, in the Korean Intellectual Property Office, the entire disclosure of which is incorporated herein by reference for all purposes.

BACKGROUND

1. Field

The following description relates to a backscatter communication method and apparatus based on pattern-based demodulation.

2. Description of Related Art

Research is ongoing on ambient backscatter communication, as a type of ultralow-power communication, through which information is transmitted and received using a background radio frequency (RF) signal.

In general, the ambient backscatter communication may simultaneously use two methods—a method of calculating an average of a received signal for a certain period of time and reducing a swing or jitter by a background RF signal, and a method of comparing the average of the received signal and a preset threshold value and determining bit information of the received signal—to determine a received signal.

However, the two methods may not be effective in terms of performance of demodulating a backscattered communication signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides technology for dynamically demodulating a backscattered communication signal without using a threshold point by determining signal information based on a pattern of a communication signal.

According to an aspect, there is provided a backscatter communication method including receiving a communication signal, and demodulating the communication signal based on a slope of the communication signal at an edge of each time interval.

A time interval may be a bit time interval of the communication signal.

The demodulating may include calculating a slope of the communication signal at both edges of a time interval, generating a plurality of bit strings corresponding to the communication signal at the both edges based on the calculated slope, and demodulating a backscattered communication signal which is backscattered from the communication signal based on the generated bit strings.

The calculating of the slope may include calculating a first slope of the communication signal at a preceding edge of the both edges, and calculating a second slope of the communication signal at a following edge of the both edges.

The generating of the bit strings may include generating a first bit string for the preceding edge based on whether the first slope has a positive value, and generating a second bit string for the following edge based on whether the second slope has a positive value.

The generating of the first bit string may include generating the first bit string to be (0,1) in response to the first slope having a positive value, and generating the first bit string to be (1,0) in response to the first slope not having a positive value.

The generating of the second bit string may include generating the second bit string to be (0,1) in response to the second slope having a positive value, and generating the second bit string to be (1,0) in response to the second slope not having a positive value.

The demodulating of the backscattered communication signal may include determining a received value of the backscattered communication signal in the time interval based on the bit strings, and demodulating the backscattered communication signal based on the determined received value.

The demodulating of the backscattered communication signal may include determining a received value of the backscattered communication signal in the time interval based on the first bit string and the second bit string, and demodulating the backscattered communication signal based on the determined received value.

The determining of the received value may include determining the received value based on a last bit value of the first bit string and a first bit value of the second bit string.

The determining of the received value based on the last bit value of the first bit string and the first bit value of the second bit string may include determining whether the last bit value of the first bit string and the first bit value of the second bit string correspond to each other, determining the corresponding bit value to be the received value in response to the last bit value of the first bit string and the first bit value of the second bit string corresponding to each other, and comparing an absolute value of the first slope and an absolute value of the second slope and determining the received value based on a bit value generated from a slope having a greater absolute value between the first slope and the second slope, in response to the last bit value of the first bit string and the first bit value of the second bit string not corresponding to each other.

According to another aspect, there is provided a backscatter communication apparatus including a receiver configured to receive a communication signal, and a controller configured to demodulate the communication signal based on a slope of the communication signal at an edge of each time interval.

A time interval may be a bit time interval of the communication signal.

The controller may include a calculator configured to calculate a slope of the communication signal at both edges of a time interval, a generator configured to generate a plurality of bit strings corresponding to the communication signal at the both edges based on the calculated slope, and a demodulator configured to demodulate a backscattered communication signal which is backscattered from the communication signal based on the generated bit strings.

The calculator may be configured to calculate a first slope of the communication signal at a preceding edge of the both edges, and calculate a second slope of the communication signal at a following edge of the both edges.

The generator may be configured to generate a first bit string for the preceding edge based on whether the first slope has a positive value, and generate a second bit string for the to following edge based on whether the second slope has a positive value.

The generator may be configured to generate the first bit string to be (0,1) in response to the first slope having a positive value, and generate the first bit string to be (1,0) in response to the first slope not having a positive value.

The generator may be configured to generate the second bit string to be (0,1) in response to the second slope having a positive value, and generate the second bit string to be (1,0) in response to the second slope not having a positive value.

The demodulator may be configured to determine a received value of the backscattered communication signal in the time interval based on the bit strings, and demodulate the backscattered communication signal based on the determined received value.

The demodulator may be configured to determine a received value of the backscattered communication signal in the time interval based on the first bit string and the second bit string, and demodulate the backscattered communication signal based on the determined received value.

The demodulator may be configured to determine whether a last bit value of the first bit string and a first bit value of the second bit string correspond to each other, determine the corresponding bit value to be the received value in response to the last bit value of the first bit string and the first bit value of the second bit string corresponding to each other, and compare an absolute value of the first slope and an absolute value of the second slope and determine the received value based on a bit value generated from a slope having a greater absolute value between the first slope and the second slope, in response to the last bit value of the first bit string and the first bit value of the second bit string not corresponding to each other.

Other features and aspects will be apparent from the following detailed description, the drawings, and the claims.

Figure 1:
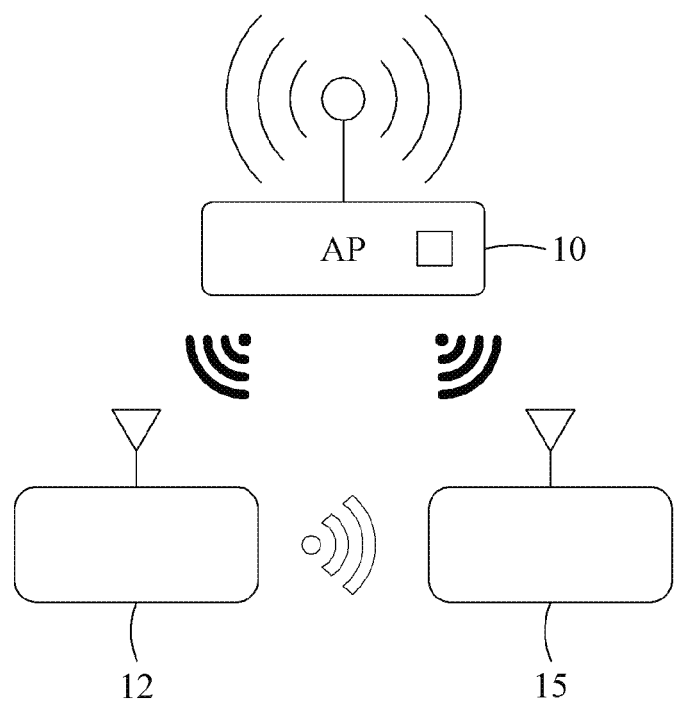
FIG. 1 is a schematic diagram illustrating an example of general ambient backscatter communication.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a schematic diagram illustrating an example of general ambient backscatter communication. The ambient backscatter communication is also shortly referred to as a backscatter communication herein.

Referring to FIG. 1, backscatter communication refers to communication technology, which is a type of ultra-low power communication, through which information may be transmitted and received using energy collected from a background radio frequency (RF) signal.

Researchers have been conducting research on backscatter communication, a type of ultra-low power communication, which transmits and receives information using energy collected from a background RF signal in an ultra-high frequency (UHF) television (TV) band, for example. However, technologies and methods that have been developed up to the present through research may not be applicable to smartphones because smartphones do not receive a radio wave in the UHF TV band.

Researchers have also been conducting research on backscatter communication using a WiFi background RF signal. For example, a general backscatter communication system includes an access point (AP) 10, a user terminal 12, and a communication apparatus 15 performing the backscatter communication as illustrated in FIG. 1.

The backscatter communication may determine a received signal using the following two methods simultaneously. The first method may calculate an average of the received signal for a certain period of time (window) and reduce a swing or jitter caused by a background RF signal. The second method may compare the average of the received signal and a preset threshold value, and determine bit information of the received signal.

However, incorrect setting of the threshold value may result in an error in demodulation of a backscattered communication signal because a change in signal magnitude by a backscatter communication bit is extremely small. In addition, in an environment where a signal changes dynamically, the threshold value may need to be set in real time, and an overhead may thus ensue and communication performance may be degraded accordingly. Further, despite correct setting of the threshold value, an error may occur in demodulation because a change in signal magnitude by a backscatter communication bit is considerably smaller than a swing or jitter caused by a WiFi background RF signal.

Example embodiments described herein provide a pattern-based signal demodulation method that enables demodulation of a backscattered communication signal without using such threshold value. Further, the example embodiments provide technology for removing an error in demodulation of a backscattered communication signal and removing an overhead.

Hereinafter, the example embodiments will be described in detail with reference to FIGS. 2 through 10.

Figure 2:
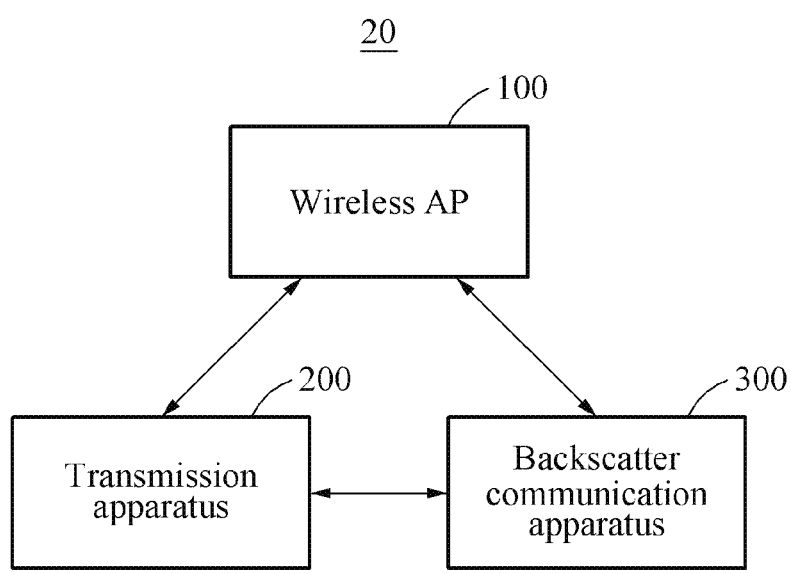
FIG. 2 is a diagram illustrating an example of a communication system according to an example embodiment.

FIG. 2 is a diagram illustrating an example of a communication system according to an example embodiment.

Referring to FIG. 2, a communication system 20 includes a wireless AP 100, a transmission apparatus 200, and a backscatter communication apparatus 300.

The communication system 20 may be an ambient backscatter communication system using ambient backscatter communication. The backscatter communication refers to technology for performing communication by reflecting or absorbing a background RF signal while receiving minimum power required for a circuit operation from the background RF signal.

The wireless AP 100 may transmit a background RF signal to the transmission apparatus 200 and the backscatter communication apparatus 300. For example, the wireless AP 100 may be a router, and the background RF signal may be embodied as a WiFi signal.

The transmission apparatus 200 may be a small device to implement Internet of things (IoT). The transmission apparatus 200 may transmit data using the background RF signal. The transmission apparatus 200 may be provided between the wireless AP 100 and the backscatter communication apparatus 300 to effectively reflect the background RF signal.

The transmission apparatus 200 may reflect or absorb the background RF signal transmitted by the wireless AP 100. The transmission apparatus 200 may reflect, to the backscatter communication apparatus 300, the background RF signal transmitted by the wireless AP 100.

The backscatter communication apparatus 300 may receive power from the wireless AP 100 or the transmission apparatus 200 which are a power-based communication device. The backscatter communication apparatus 300 may receive the background RF signal. The backscatter communication apparatus 300 may perform backscatter data communication by reflecting or absorbing a WiFi packet in a wireless signal frequency band.

The backscatter communication apparatus 300 may perform pattern-based signal demodulation. That is, the backscatter communication apparatus 300 may demodulate a signal based on a slope of the signal in a time interval of the signal. The pattern-based signal demodulation performed by the backscatter communication apparatus 300 may provide a stable data transmitting and receiving method to a backscatter communication system, for example, the communication system 20.

A method of demodulation performed by the backscatter communication apparatus 300 to receive data may not be based on an existing threshold value-based method, but a method of determining a pattern of a received signal and determining information of the received signal based on the determined pattern.

The backscatter communication apparatus 300 may determine a falling edge and/or rising edge which are patterns at both edge in a backscatter bit interval. The backscatter communication apparatus 300 may determine a received bit in a corresponding bit interval based on patterns at both edges of a bit.

A method of modulation performed by the backscatter communication apparatus 300 to transmit data may follow an existing method (reflection mode: 1, absorption mode: 0) used for backscatter communication.

An existing backscatter communication method is based on a preset threshold point, and thus it may need to calculate an accurate threshold point and update the threshold point in real time. However, the pattern-based signal demodulation method performed by the backscatter communication apparatus 300 may be suitable for a dynamic environment because it does not depend on such a preset value.

The backscatter communication apparatus 300 will be described in detail with reference to FIGS. 3 and 4. In addition, the pattern-based signal demodulation method performed by the backscatter communication apparatus 300 will be described in detail with reference to FIGS. 5 through 10.

Figure 3:
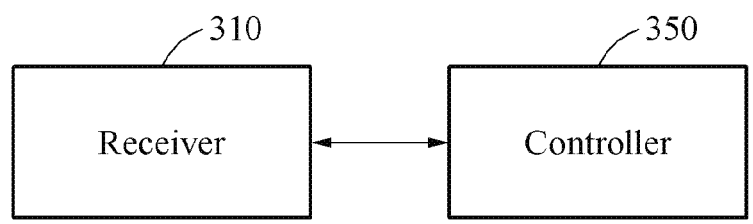
FIG. 3 is a diagram illustrating a backscatter communication apparatus in the communication system illustrated in FIG. 2.

FIG. 3 is a diagram illustrating the backscatter communication apparatus 300 illustrated in FIG. 2. FIG. 4 is a diagram illustrating a controller illustrated in FIG. 3.

Figure 4:
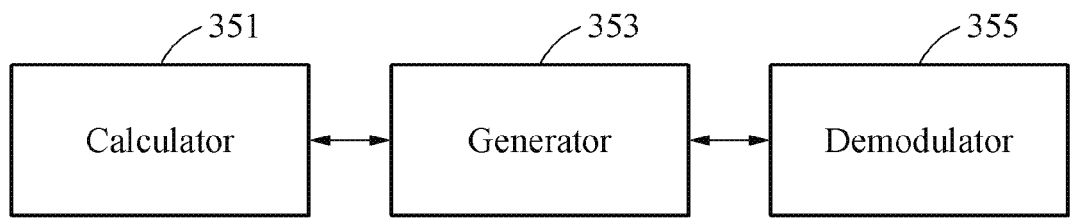
FIG. 4 is a diagram illustrating a controller of the backscatter communication apparatus illustrated in FIG. 3.

Referring to FIGS. 3 and 4, the backscatter communication apparatus 300 includes a receiver 310 and a controller 350.

The receiver 310 may receive a communication signal of the wireless AP 100 and/or the transmission apparatus 200. The communication signal may be a background RF signal transmitted by the wireless AP 100 and/or the transmission apparatus 200.

The controller 350 may demodulate the communication signal based on a slope of the communication signal at an edge of each time interval, for each time interval. The time interval may be a bit time interval of the communication signal. Hereinafter, an operation of the controller 350 will be described in detail with reference to FIG. 4.

The controller 350 includes a calculator 351, a generator 353, and a demodulator 355.

The calculator 351 may calculate slopes of the communication signal at both edges of a time interval.

The calculator 351 may calculate a first slope of the communication signal at a preceding edge of the both edges of the time interval based on a time at which the communication signal is received. The calculator 351 may also calculate a second slope of the communication signal at a following edge of the both edges of the time interval based on the time at which the communication signal is received.

The generator 353 may generate a plurality of bit strings corresponding to the communication signal at the both edges of the time interval based on the calculated slopes.

The generator 353 may generate a first bit string for the preceding edge based on whether the first slope has a positive (+) value. In response to the first slope having a positive value, the generator 353 may generate the first bit string to be (0,1). In response to the first slope not having a positive value, the generator 353 may generate the first bit string to be (1,0).

The generator 353 may also generate a second bit string for the following edge based on whether the second slope has a positive (+) value. In response to the second slope to having a positive value, the generator 353 may generate the second bit string to be (0,1). In response to the second slope not having a positive value, the generator 353 may generate the second bit string to be (1,0).

The demodulator 355 may demodulate a communication signal backscattered from the communication signal based on the generated bit strings. The communication signal backscattered from the communication signal is also referred to as a backscattered communication signal.

The demodulator 355 may determine a received value of the backscattered communication signal in the time interval based on the bit strings. The demodulator 355 may demodulate the backscattered communication signal based on the determined received value.

The demodulator 355 may determine a received value of the backscattered communication signal in the time interval based on the first bit string and the second bit string. The demodulator 355 may demodulate the backscattered communication signal based on the determined received value.

The demodulator 355 may determine the received value based on a last bit value of the first bit string and a first bit value of the second bit string.

The demodulator 355 may determine whether the last bit value of the first bit string and the first bit value of the second bit string correspond to each other. In response to the last bit value of the first bit string and the first bit value of the second bit string corresponding to each other, the demodulator 355 may determine the corresponding bit value to be the received value.

For example, when the first bit string is (1,0) and the second bit string is (0,1), the demodulator 355 may verify that a last bit value of the first bit string is 0 and a first bit value of the second bit string is 0, and determine a received value in a corresponding bit interval to be 0.

However, in response to the last bit value of the first bit string and the first bit value of the second bit string not corresponding to each other, the demodulator 355 may compare an absolute value of the first slope and an absolute value of the second slope and determine the received value based on a bit value generated from a slope having a greater absolute value between the first slope and the second slope.

Figure 5:
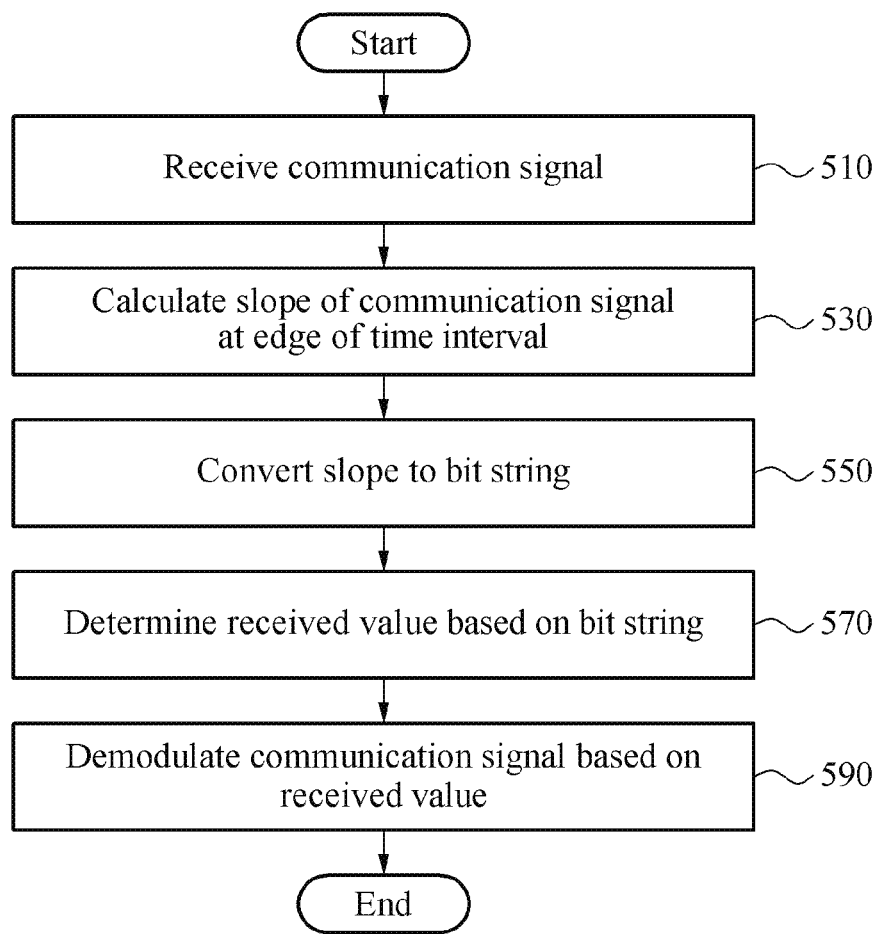
FIG. 5 is a flowchart illustrating an example of a method of demodulating a backscattered signal to be performed by a backscatter communication apparatus according to an example embodiment.
Figure 6:
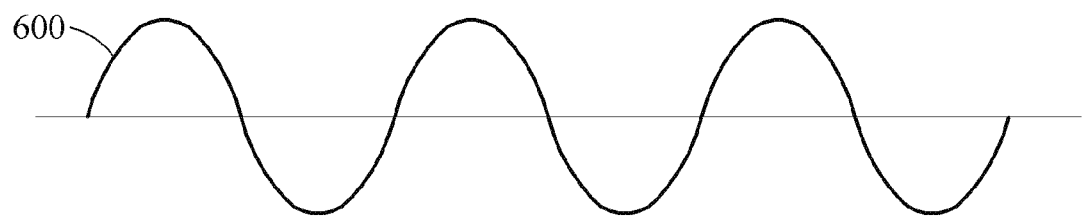
FIGS. 6 through 10 are diagrams illustrating an example of a backscatter communication method to be performed by a backscatter communication apparatus according to an example embodiment.

FIG. 5 is a flowchart illustrating an example of a method of demodulating a backscattered signal to be performed by a backscatter communication apparatus according to an example embodiment. FIGS. 6 through 10 are diagrams illustrating an example of a backscatter communication method to be performed by a backscatter communication apparatus according to an example embodiment.

Hereinafter, a method of demodulating a backscattered signal performed by the backscatter communication apparatus 300 will be described in detail with reference to FIGS. 5 through 10.

Referring to FIGS. 5 through 10, in operation 510, the backscatter communication apparatus 300 receives a communication signal. The communication signal is illustrated as a sine wave 600 in FIG. 6 as an example to provide convenience of description.

For example, the backscatter communication apparatus 300 may calculate a travel interval average for each interval of a certain size of the communication signal. In this example, the size may be an arbitrary set value to obtain the travel interval average, and not be limited to a specific value.

In operation 530, the backscatter communication apparatus 300 calculates a slope of the communication signal at an edge of a time interval.

Figure 7:
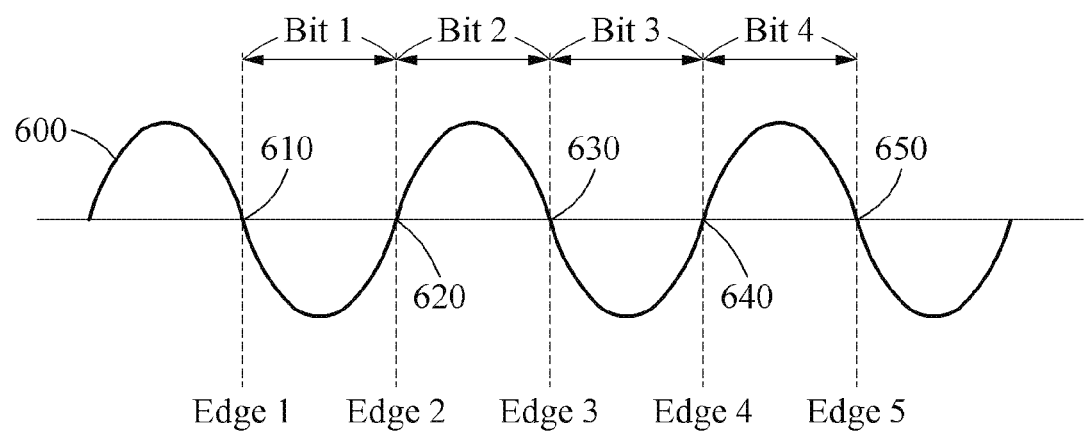

For example, the backscatter communication apparatus 300 may divide the communication signal by a time interval, for example, a bit time, after calculating the travel interval average. As illustrated in FIG. 7, the backscatter communication apparatus 300 divides the communication signal into bit time intervals, for example, Bit 1, Bit 2, Bit 3, and Bit 4.

The backscatter communication apparatus 300 may obtain a slope at an edge of each time interval. As illustrated in FIG. 7, edges of the time intervals obtained by diving the communication signal by the backscatter communication apparatus 300 are Edge 1, Edge 2, Edge 3, Edge 4, and Edge 5.

Figure 8:
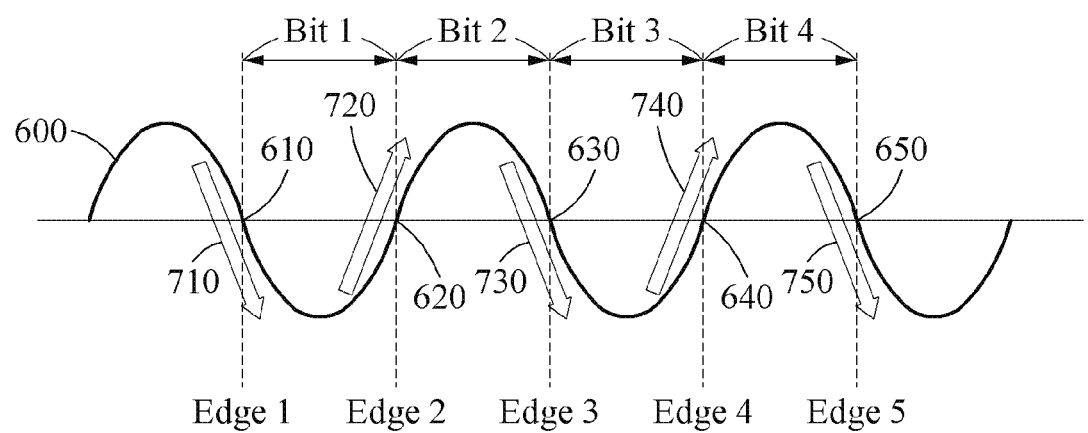

As illustrated in FIG. 8, the backscatter communication apparatus 300 obtains respective slopes 710, 720, 730, 740, and 750 at edges 610, 620, 630, 640, and 650 of corresponding time intervals. Herein, a slope may have a positive real number at a rising edge, and a negative real number at a falling edge.

For example, since there may be a swing or jitter of a received communication signal, the backscatter communication apparatus 300 may calculate a slope using a slope prediction method such as, for example, linear regression. However, a method of calculating a slope that is performed by the backscatter communication apparatus 300 is not limited to the linear regression.

In operation 550, the backscatter communication apparatus converts the slope to a bit string.

For example, when an edge is a falling edge, or when a slope at an edge in a time interval is a negative value, the backscatter communication apparatus 300 may convert the slope to a bit string of (1,0).

When an edge is a rising edge, or when a slope at an edge in a time interval is a positive value, the backscatter communication apparatus 300 may convert the slope to a bit string of (0,1).

Figure 9:
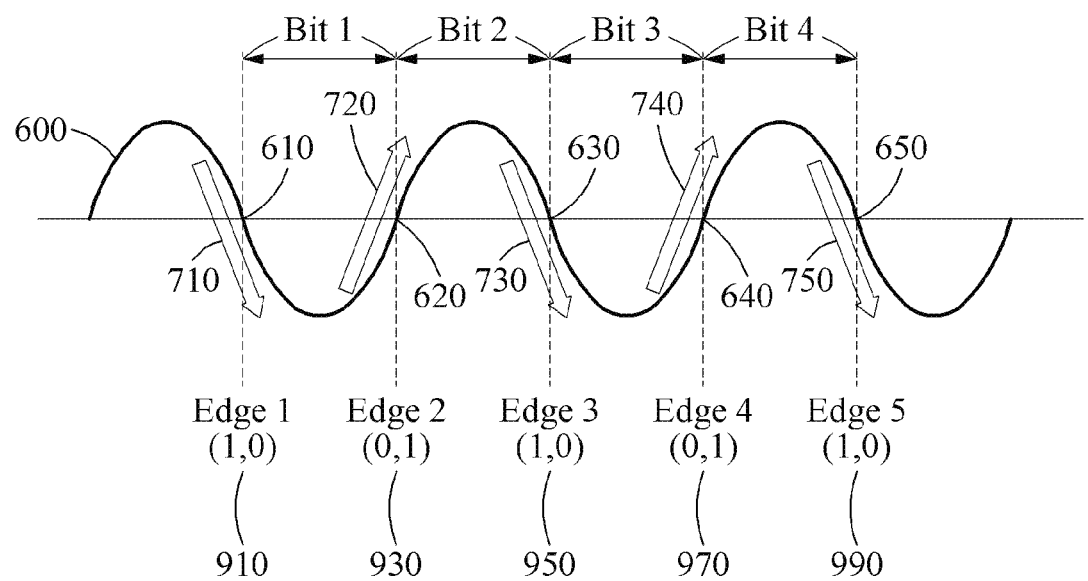

As illustrated in FIG. 9, the backscatter communication apparatus 300 converts Edge 1, Edge 3, and Edge 5 of slopes 710, 730, and 750 which have negative values to bit strings (1,0) 910, 950, and 990. In addition, the backscatter communication apparatus 300 converts Edge 2 and Edge 4 of slopes 720 and 740 which have positive values to bit strings (0,1) 930 and 970.

In operation 570, the backscatter communication apparatus 300 determines a received value of a backscattered communication signal in the time interval based on the bit string.

For example, the backscatter communication apparatus 300 may compare edge values corresponding to both edges of each bit to determine the received value of the backscattered communication signal. For example, the both edges may be Edge 1 and Edge 2 of Bit 1 as illustrated. In this example, Edge 1 may be a preceding edge of Bit 1 and Edge 2 may be a following edge of Bit 1.

For example, the backscatter communication apparatus 300 may determine a received value of Bit 1 based on an edge value of Edge 1 and a bit string corresponding to Edge 2. The backscatter communication apparatus 300 may also determine a received value of Bit 2 based on an edge value of Edge 2 and a bit string corresponding to Edge 3.

The backscatter communication apparatus 300 may also determine a received value of Bit 3 based on an edge value of Edge 3 and a bit string corresponding to Edge 4. The backscatter communication apparatus 300 may also determine a received value of Bit 4 based on an edge value of Edge 4 and a bit string corresponding to Edge 5.

Figure 10:
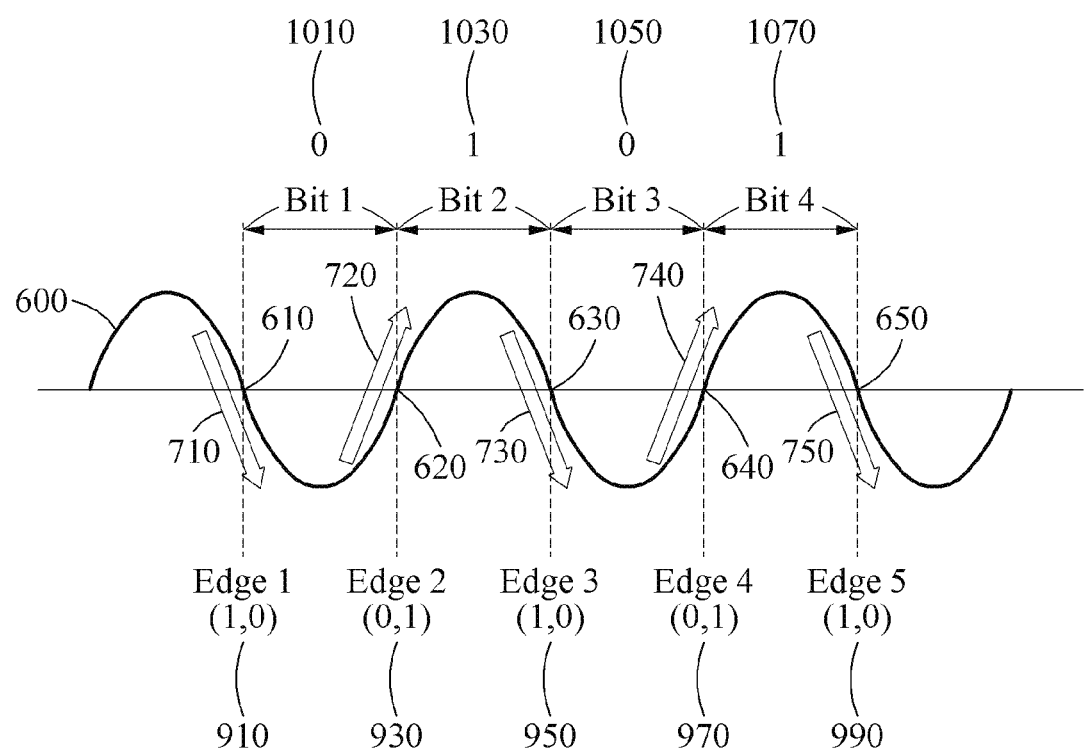

As illustrated in FIG. 10, the backscatter communication apparatus 300 determines a received value 1010 of Bit 1 to be 0 based on a bit string (1,0) for Edge 1 and a bit string (0,1) for Edge 2. The backscatter communication apparatus 300 also determines a received value 1030 of Bit 2 to be 1 based on the bit string (0,1) for Edge 2 and a bit string (1,0) for Edge 3.

The backscatter communication apparatus 300 also determines a received value 1050 of Bit 3 to be 0 based on the bit string (1,0) for Edge 3 and a bit string (0,1) for Edge 4. The backscatter communication apparatus 300 also determines a received value 1070 of Bit 4 to be 1 based on the bit string (0,1) for Edge 4 and a bit string (1,0) for Edge 5. The backscatter communication apparatus 300 may not correctly calculate bit strings for both edges, for example, it may incorrectly determine a falling edge to be a rising edge, and may not correctly determine a received value of a corresponding bit interval.

For example, the backscatter communication apparatus 300 may determine a preceding edge of a bit interval to be (0,1) and a following edge of the bit interval to be (0,1) due to an incorrect slope calculation. In this example, the backscatter communication apparatus 300 may need to determine whether to determine the bit interval to be 0 (based on a preceding bit string) or 1 (based on a following bit string).

In this example, the backscatter communication apparatus 300 may determine a received value of the corresponding bit interval based on a bit string which is more reliable. That is, the backscatter communication apparatus 300 may determine the received value of the bit interval based on an edge value of an edge having a greater absolute value of a slope between the preceding edge and the following edge. This is because a slope having a greater absolute value is determined to have a higher reliability of the slope.

In operation 590, the backscatter communication apparatus 300 demodulates the communication signal based on the determined received value.

The backscatter communication apparatus 300 does not demodulate the communication signal based on a preset threshold value, and may dynamically demodulate the communication signal even when a reception level is not smooth. Thus, the backscatter communication apparatus 300 may improve performance in reception in backscatter communication.

The backscatter communication apparatus 300 may also improve performance in WiFi background RF signal-based backscatter communication link transmission.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A backscatter communication method comprising:
receiving a communication signal; and
demodulating the communication signal based on change pattern of a slope of the communication signal at an edge of each time interval,
wherein the demodulating comprises:
    calculating a slope of the communication signal at both edges of a time interval;
    generating a plurality of bit strings corresponding to the communication signal at the both edges based on the calculated slope; and
    demodulating a backscattered communication signal which is backscattered from the communication signal based on the generated bit strings, and
wherein the calculating of the slope comprises:
    calculating a first slope of the communication signal at a preceding edge of the both edges; and
    calculating a second slope of the communication signal at a following edge of the both edges.

2. The backscatter communication method of claim 1, wherein a time interval is a bit time interval of the communication signal.

3. The backscatter communication method of claim 1, wherein the demodulating of the backscattered communication signal comprises:

determining a received value of the backscattered communication signal in the time interval based on the bit strings; and
demodulating the backscattered communication signal based on the determined received value.

4. The backscatter communication method of claim 1, wherein the generating of the bit strings comprises:
generating a first bit string for the preceding edge based on whether the first slope has a positive value; and
generating a second bit string for the following edge based on whether the second slope has a positive value.

5. The backscatter communication method of claim 4, wherein the generating of the first bit string and the second bit string comprises:
in response to the first slope having a positive value, generating the first bit string to be (0,1);
in response to the first slope not having a positive value, generating the first bit string to be (1,0);
in response to the second slope having a positive value, generating the second bit string to be (0,1); and
in response to the second slope not having a positive value, generating the second bit string to be (1,0).

6. The backscatter communication method of claim 5, wherein the demodulating of the backscattered communication signal comprises:
determining a received value of the backscattered communication signal in the time interval based on the first bit string and the second bit string; and
demodulating the backscattered communication signal based on the determined received value.

7. The backscatter communication method of claim 6, wherein the determining of the received value comprises:
determining the received value based on a last bit value of the first bit string and a first bit value of the second bit string.

8. The backscatter communication method of claim 7, wherein the determining of the received value based on the last bit value of the first bit string and the first bit value of the second bit string comprises:
determining whether the last bit value of the first bit string and the first bit value of the second bit string correspond to each other;
in response to the last bit value of the first bit string and the first bit value of the second bit string corresponding to each other, determining the corresponding bit value to be the received value; and
in response to the last bit value of the first bit string and the first bit value of the second bit string not corresponding to each other, comparing an absolute value of the first slope and an absolute value of the second slope, and determining the received value based on a bit value generated from a slope having a greater absolute value between the first slope and the second slope.

9. A backscatter communication apparatus comprising:
a receiver configured to receive a communication signal; and
a controller configured to demodulate the communication signal based on change pattern of a slope of the communication signal at an edge of each time interval,
wherein the controller comprises:
    a calculator configured to calculate a slope of the communication signal at both edges of a time interval;
    a generator configured to generate a plurality of bit strings corresponding to the communication signal at the both edges based on the calculated slope; and a demodulator configured to demodulate a backscattered communication signal which is backscattered from the communication signal based on the generated bit strings, and wherein the calculator is configured to:
calculate a first slope of the communication signal at a preceding edge of the both edges; and
calculate a second slope of the communication signal at a following edge of the both edges.

10. The backscatter communication apparatus of claim 9, wherein a time interval is a bit time interval of the communication signal.

11. The backscatter communication apparatus of claim 9, wherein the generator is configured to:
generate a first bit string for the preceding edge based on whether the first slope has a positive value; and
generate a second bit string for the following edge based on whether the second slope has a positive value.

12. The backscatter communication apparatus of claim 9, wherein the demodulator is configured to:
determine a received value of the backscattered communication signal in the time interval based on the bit strings; and
demodulate the backscattered communication signal based on the determined received value.

13. The backscatter communication apparatus of claim 9, wherein the generator is configured to:
in response to the first slope having a positive value, generate the first bit string to be (0,1);
in response to the first slope not having a positive value, generate the first bit string to be (1,0);
in response to the second slope having a positive value, generate the second bit string to be (0,1); and
in response to the second slope not having a positive value, generate the second bit string to be (1,0).

14. The backscatter communication apparatus of claim 13, wherein the demodulator is configured to:
determine a received value of the backscattered communication signal in the time interval based on the first bit string and the second bit string; and
demodulate the backscattered communication signal based on the determined received value.

15. The backscatter communication apparatus of claim 14, wherein the demodulator is configured to:
determine the received value based on a last bit value of the first bit string and a first bit value of the second bit string.

16. The backscatter communication apparatus of claim 15, wherein the demodulator is configured to:
determine whether the last bit value of the first bit string and the first bit value of the second bit string correspond to each other;
in response to the last bit value of the first bit string and the first bit value of the second bit string corresponding to each other, determine the corresponding bit value to be the received value;
in response to the last bit value of the first bit string and the first bit value of the second bit string not corresponding to each other, compare an absolute value of the first slope and an absolute value of the second slope, and determine the received value based on a bit value generated from a slope having a greater absolute value between the first slope and the second slope.

* * * * *